(12) United States Patent
Hanner et al.

(10) Patent No.: US 8,442,931 B2
(45) Date of Patent: May 14, 2013

(54) GRAPH-BASED DATA SEARCH

(75) Inventors: Brian D. Hanner, Campbell, CA (US); Jason Amanatullah, Campbell, CA (US); Timothy Chung-Ming Wu, San Jose, CA (US)

(73) Assignee: The Boeing Company, Chicago, IL (US)

( * ) Notice: Subject to any disclaimer, the term of this patent is extended or adjusted under 35 U.S.C. 154(b) by 949 days.

(21) Appl. No.: 12/325,707

(22) Filed: Dec. 1, 2008

(65) Prior Publication Data

US 2010/0138375 A1 Jun. 3, 2010

(51) Int. Cl.
| | |
|---|---|
| G06F 17/00 | (2006.01) |
| G06F 15/16 | (2006.01) |
| G06F 9/00 | (2006.01) |
| G06F 11/00 | (2006.01) |
| G06F 13/00 | (2006.01) |
| G06F 12/14 | (2006.01) |
| G06N 5/02 | (2006.01) |
| G08B 23/00 | (2006.01) |

(52) U.S. Cl.
USPC .......... 706/48; 726/13; 726/22; 726/23; 726/24; 726/25

(58) Field of Classification Search ........... 726/13, 726/22–25
See application file for complete search history.

(56) References Cited

U.S. PATENT DOCUMENTS

| | | | | |
|---|---|---|---|---|
| 5,608,662 A * | 3/1997 | Large et al. | ........... | 708/300 |
| 6,889,218 B1 * | 5/2005 | Nassehi | ........... | 706/45 |
| 7,082,044 B2 * | 7/2006 | Gould et al. | ........... | 365/49.1 |
| 7,093,023 B2 * | 8/2006 | Lockwood et al. | ........... | 709/231 |
| 7,171,440 B2 | 1/2007 | Hanner | | |
| 7,191,468 B2 | 3/2007 | Hanner | | |
| 7,301,792 B2 * | 11/2007 | Gould et al. | ........... | 365/49.15 |
| 7,305,391 B2 * | 12/2007 | Wyschogrod et al. | ........... | 1/1 |
| 7,356,663 B2 * | 4/2008 | Jain | ........... | 711/173 |
| 7,366,910 B2 | 4/2008 | Hanner | | |
| 7,370,361 B2 * | 5/2008 | de los Santos et al. | ........... | 726/24 |
| 7,411,418 B2 * | 8/2008 | Gould et al. | ........... | 326/46 |
| 7,508,985 B2 * | 3/2009 | Van Lunteren | ........... | 382/181 |
| 7,530,107 B1 * | 5/2009 | Ono et al. | ........... | 726/25 |
| 7,565,380 B1 * | 7/2009 | Venkatachary | ........... | 1/1 |
| 7,636,717 B1 * | 12/2009 | Gupta et al. | ........... | 1/1 |
| 7,805,392 B1 * | 9/2010 | Steele et al. | ........... | 706/48 |
| 7,945,528 B2 * | 5/2011 | Cytron et al. | ........... | 706/62 |
| 8,086,554 B1 * | 12/2011 | Steele et al. | ........... | 706/48 |
| 2003/0123456 A1 | 7/2003 | Denz et al. | | |
| 2004/0162826 A1 * | 8/2004 | Wyschogrod et al. | ........... | 707/6 |
| 2005/0028114 A1 * | 2/2005 | Gould et al. | ........... | 716/3 |
| 2005/0132342 A1 * | 6/2005 | Van Lunteren | ........... | 717/143 |
| 2005/0177736 A1 * | 8/2005 | de los Santos et al. | ........... | 713/188 |
| 2006/0085389 A1 * | 4/2006 | Flanagan et al. | ........... | 707/2 |
| 2006/0101195 A1 * | 5/2006 | Jain | ........... | 711/104 |

OTHER PUBLICATIONS

Idika, Nwokedi et al.; "A Survey of Malware Detection Techniques"; 2007; Purdue University Department of Computer Science; pp. 1-48.*

(Continued)

*Primary Examiner* — Jeffrey A Gaffin
*Assistant Examiner* — Stanley K Hill
(74) *Attorney, Agent, or Firm* — Baldwin D. Quan

(57) ABSTRACT

Computer based systems and methods for searching data transiting a network using a graph-based search model. A set of rules that describe strings or patterns of data to be identified in the data set, is expressed as a graph. As blocks of the data set are obtained for processing, the state of the graph is updated based upon the value of the received data block. The transition to the next state depends upon both the current state and the received data block. As blocks of data are received and processed, the graph is traversed until one of the rules is identified.

22 Claims, 9 Drawing Sheets

OTHER PUBLICATIONS

Mikkel Christiansen, et al., "An MTIDD Based Firewall", Telecommunication Systems; Modeling, Analysis, Design and Management, Kluwer Academic Publishers, BO, vol. 27, No. 2-4, Oct. 1, 2004, pp. 297-319.

Dan Decasper et al., "Router Plugins: A Software Architecture for Next-Generation Routers", IEEE/ACM Transactions on Networking, IEEE/ACM, New York, NY, US, vol. 8, No. 1, Feb. 1, 2000, pp. 2-15.

International Search Report issued in International application No. PCT/US2009/065929, dated Mar. 17, 2010.

* cited by examiner

FIG. 7

| ADDR | OFFSET | # BYTES | MIN VAL | MAX VAL | POINTER | RULE # | NOTES |
|---|---|---|---|---|---|---|---|
| 0 | A | 2 | 10 | 49 | 4 | | NODE 1 → NODE 2 |
| 1 | A | 2 | 50 | 100 | 7 | | NODE 1 → NODE 3 |
| 2 | A | 2 | 101 | 200 | 12 | | NODE 1 → NODE 4 |
| 3 | A | 2 | 0 | 64K | 15 | | NODE 1 → NODE 5 |
| 4 | B | 4 | 15 | 15 | 18 | | NODE 2 → NODE 7 |
| 5 | B | 4 | 2 | 20 | 16 | | NODE 2 → NODE 6 |
| 6 | B | 4 | 0 | 2^32-1 | 15 | | NODE 2 → NODE 5 |
| 7 | B | 4 | 21 | 21 | MATCH | 1 | NODE 3 → NODE 9 |
| 8 | B | 4 | 5 | 5 | 21 | | NODE 3 → NODE 8 |
| 9 | B | 4 | 15 | 15 | 18 | | NODE 3 → NODE 7 |
| 10 | B | 4 | 2 | 20 | 16 | | NODE 3 → NODE 6 |
| 11 | B | 4 | 0 | 2^32-1 | 15 | | NODE 3 → NODE 5 |
| 12 | B | 4 | 5 | 5 | 21 | | NODE 4 → NODE 8 |
| 13 | B | 4 | 21 | 21 | MATCH | 1 | NODE 4 → NODE 9 |
| 14 | B | 4 | 0 | 2^32-1 | 15 | | NODE 4 → NODE 5 |
| 15 | C | 2 | 100 | 100 | 25 | | NODE 5 → NODE 13 |
| 16 | C | 2 | 100 | 100 | 25 | | NODE 6 → NODE 13 |
| 17 | C | 2 | 40 | 40 | 24 | | NODE 6 → NODE 10 |
| 18 | C | 2 | 40 | 40 | 24 | | NODE 7 → NODE 10 |
| 19 | C | 2 | 50 | 50 | MATCH | 3 | NODE 7 → NODE 11 |
| 20 | C | 2 | 100 | 100 | 25 | | NODE 7 → NODE 13 |
| 21 | C | 2 | 40 | 40 | 24 | | NODE 8 → NODE 10 |
| 22 | C | 2 | 100 | 100 | 25 | | NODE 8 → NODE 13 |
| 23 | C | 2 | 700 | 700 | MATCH | 2 | NODE 8 → NODE 12 |
| 24 | D | 2 | 22 | 22 | MATCH | 4 | NODE 10 → NODE 14 |
| 25 | E | 2 | 5 | 50 | MATCH | 5 | NODE 13 → NODE 15 |

GRAPH-BASED DATA SEARCH

FIELD

The present patent application relates generally to searching data to identify strings or data patterns of interest. More particularly, graph model based systems and methods for identifying strings or data patterns are described herein.

BACKGROUND

Recent years have seen an exponential growth in the quantity of data generated and available. At the same time there has been an explosion in connectivity and exchange of data. The importance of networks, including intranets, local area networks (LANs), wide area networks (WANs) and the Internet, has increased dramatically. Rapid exchange of electronic communications and data permeates modern workplaces. Unfortunately, this connectivity has also been exploited by spammers, hackers and others for unauthorized purposes.

Various systems for the detection and/or prevention of unauthorized data and software, also referred to as malware, are currently utilized with networks. For example, an intrusion detection system ("IDS") searches data transmissions looking for strings of data that are indicative of malware. Processing data in transit, such as computer messages traversing a network, typically involves comparing message data to a set of rules that characterize instances of malware. Message data matching one or more of the rules is identified as malware. The rules are constantly updated and new rules added as new forms of malware are created and identified. When an instance of malware is identified in a network, the network may take steps to alert users, act to isolate the malware and/or prevent the malware from reaching its destination.

Data search systems frequently utilize tree search methodologies to process data for a rule set. Tree search methodologies use a tree data structure and sequentially compare the data set being evaluated to each rule of the rule set. If the data set fails to match the current rule being processed, the data set is compared to the next rule in the rule set, until either a match is identified, or the data has been processed against all the rules and it is determined that there is no match. In an IDS, if the data set does not match any of the rules in the rule set, the data set is not an instance of malware currently described in the rule set. When a tree search method is used, data communications are intercepted and maintained or held, such that an entire communication or data set is available for sequential processing against the rule set. Each time the data is compared to a rule, the entire data set should be available for comparison. Holding the data for comparison introduces a latency in transit of data. As a result, searching for malware in network data transmissions utilizing tree search methods introduces latency across the network. In addition, sequential comparisons used in tree search methods are generally slow, which makes these methods unsuitable for many high speed networks, such as those operating at Gigabit speeds.

In other data search systems, parallel processing is implemented in place of tree search methodologies, which results in increased search speed. Parallel processors are typically implemented in hardware. For example, parallel processing can be implemented using multiple processing cores or Field Programmable Gate Arrays (FPGAs). In a search system, processing resources are allocated to individual rules of the rule set. Accordingly, instead of sequentially processing the data set against each rule in the rule set, the data set may be processed against multiple rules in parallel utilizing the separate processors. While parallel processing eliminates at least some of the latency introduced by tree search methods, hardware requirements may limit the utility of this solution. For true parallel processing, a separate processor is required for each rule in the rule set. Accordingly, the addition of a rule to the rule set would require the addition of hardware. This is not practical in IDS systems, which require updates to the rule set for each new instance of malware. Moreover, in conventional parallel processing systems, the availability of processing resources limits the number of rules to only hundreds or perhaps thousands of rules. Consequently, these types of parallel processing units are unable to handle rule sets of tens of thousands, required in many applications.

Accordingly, there is a need for a system and method that provides for large number of rules, without excessive hardware requirements or introduction of large latency.

SUMMARY

The following summary is intended to provide a simple overview as well as to provide a basic understanding of the subject matter described herein. It is not intended to describe or limit the scope of the claimed subject matter. Furthermore, this summary is not intended to describe critical or key elements of the claimed subject matter. Additional aspects and embodiments are described below in the detailed description.

Systems and methods for searching of data are described herein. Generally, searching of data includes the evaluation of data using a set of rules for comparison. In particular, the described systems and methods allow for searching of data in transit and do not require that the entire data string to be evaluated be maintained for comparison with a rule set and identification of a matching rule.

In an aspect, the present disclosure provides a method for searching a data set for one or more data values. The method may include obtaining a data block of the data set, traversing a graph rule set based at least in part upon a current state of the graph rule set and the data block, where the graph rule set is a graph representation of a set of rules, and identifying a rule of the set of rules as a function of traversal of the graph rule set for the data set, where the set of rules describes the one or more data values being searched.

In a further aspect, the present disclosure is related to a computer-based method for generation of a graph representation of a rule set. The computer-based method may include selecting a rule from the rule set, determining at least one verification set for the selected rule, where the verification sets encompasses all valid values. Each of the one or more determined verification sets are processed by creating a subgraph for each of the verification sets and recursively processing the subgraph. The subgraph is linked to the graph representation.

In still another aspect, the present disclosure provides a system that searches a data set for one or more data patterns. The system may include a receiver component that obtains at least one data block of the data set and a graph rule set that represents a set of rules as a graph, where the set of rules describes the one or more data patterns. The system further includes a search component that traverses the graph rule set as a function of a current state of the graph rule set and at least one data block, and identifies a rule from the set of rules based upon traversal of the graph rule set.

In still another aspect, the present disclosure provides a system for filtering a data set for one or more data patterns. The system may include a means for obtaining a data block of the data set, a means for searching the data set using a graph rule set and based at least in part upon a current state of the graph rule set and the data block, where the graph rule set is a graph representation of a set of rules that describe the one or more data patterns. The system further includes a means for filtering the data set to generate a filtered data set based at least in part upon searching the data set.

BRIEF DESCRIPTION OF THE DRAWINGS

The claimed subject matter is described with reference to the accompanying drawings. A brief description of each figure is provided below. Elements with the same reference number in each figure indicate identical or functionally similar elements. Additionally, the left-most digit(s) of a reference number indicate the drawing in which the reference number first appears.

FIG. 7 depicts a search system based upon the exemplary rule set of Table 1 in accordance with an aspect of the subject matter described herein;

DESCRIPTION

Data searches typically involve comparison of a data set to a set of rules that characterize the strings or data patterns to be identified. Speed in evaluating data and identifying specific patterns is particularly important where data transmissions are being searched. Delay in evaluation of network communications result in network latency and a decrease in network throughput. Typically, search systems utilize a tree search model to evaluate data with respect to a set of rules that characterize the data patterns to be identified in the search. Such search models sequentially compare the data set to each rule in the rule set until a matching rule is identified or the data set has been compared to all the rules. If the data fails to match a rule, then the next rule in the rule set is compared, and so on. During the search, the complete data set must be maintained and available for comparison to each rule during sequential processing of the rule set. Consequently, the entire data set is maintained during the sequential rule comparisons rather than being forwarded or delivered. This delay increases latency across the network and makes tree search models unsuitable for real time processing of data. Furthermore, sequential comparisons are relatively slow and not suitable to networks operating Gigabit speeds and above.

In contrast to conventional tree search models, the systems and methods described herein utilize graph representations of the rule sets. In a graph representation, the elements or nodes of the graph represent processing states during evaluation of data and the paths or state transitions between nodes are based on analysis of the data blocks within the data set. Graph search methods differ from conventional tree search methods in that there is a single path of state transitions associated with a given data set. For any given data value, only one state transition will be valid from the current state. At each state or node of the graph, transition to the next state is determined solely by the current state and analysis of the current block or field of data. This is possible by defining each state such that it uniquely represents the analysis results of all previously processed data, as it relates to the rule set. As a result of the graph structure, graph based methods are able to process data in real time. Instead of maintaining an entire data set containing multiple blocks of data, each block is processed as it arrives at the search system. Once the current block is processed, the block may be transmitted onward and need not be maintained in memory because the current state of the graph will reflect that processed data block. The processing of individual data blocks and traversal of the graph is described in detail in the examples below.

Figure 1:
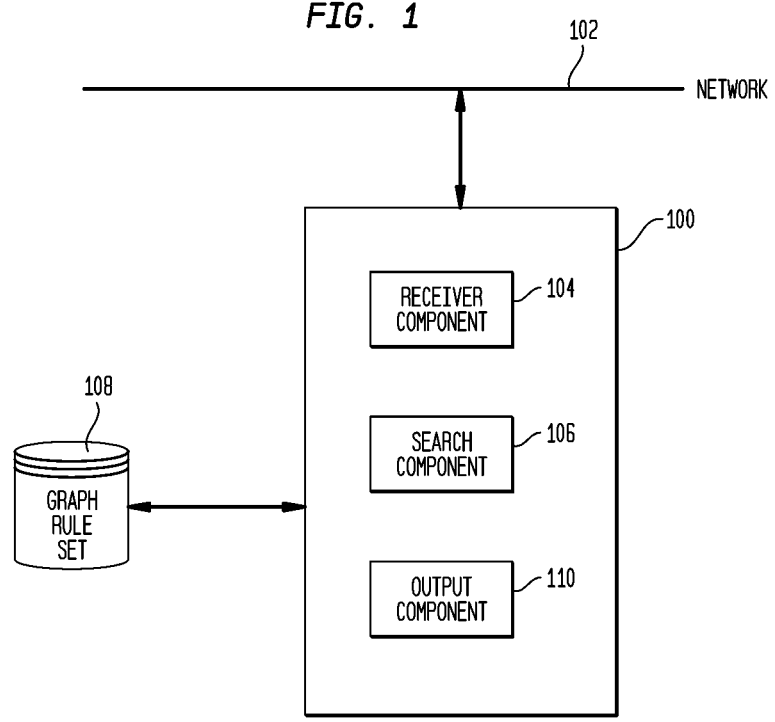
FIG. 1 is a block diagram of a system capable of searching data in transit in accordance with an aspect of the subject matter described herein.

Referring now to FIG. 1, an embodiment of a search system 100 that utilizes a graph model search method is illustrated. In an aspect, the search system 100 may be part of an overall Intrusion Detection System (IDS) that identifies malware in electronic communications. In another aspect, the search system 100 may interface to a computer network 102 upon which packet searching or filtering operations are desired. A search system 100 constructed or implemented as described herein may operate in a variety of network environments. For example, an IDS capable of performing search operations in a manner disclosed herein may monitor network traffic 1) within a LAN; 2) between a LAN and an external network such as the Internet, where the IDS may form a portion of a firewall system; or 3) between sub-networks within a system of networks.

In an aspect, the search system 100 includes a receiver component 104 that receives or obtains data blocks for analysis. As used herein, terms such as "component" and "system" refer to computer-related entities, such as hardware, firmware, software or any combination thereof, including software in execution. For example, a component may be, but is not limited to, a process running on a processor, a processor, an object, an executable, a thread of execution, a program, and/or a computer. Both an application running on computer and the computer can be a component.

In an aspect, the receiver component 104 obtains data blocks or packets from the network 102 or other data source. In a further aspect, the receiver component 104 may act as an interface between the search system 100 and a network 102 upon which search operations are desired. Frequently, data communications or data sets are divided into multiple data packets or blocks for transmission across a network 102. Consequently, the receiver component 104 is likely to receive the set of data blocks that make up a data set over a period of time. As used herein, the term "data block" simply means a collection or group of data elements.

In an aspect, data packets are processed by a search component 106 upon receipt. The search component 106 evaluates data packets obtained by the receiver component 104 utilizing a graph model based rule set 108. The graph model based rule set 108, also referred to herein as a graph rule set, may represent a set of rules that characterize data strings or data patterns of interest. The graph rule set 108 represents such rules using a graph model, in which each node or element of the graph represents a state based upon analysis of received data blocks. Paths between the nodes of the graph rule set 108 represent state transitions based upon analysis of the data. An exemplary graph rule set 108 is illustrated and described in detail below.

The search component 106 utilizes the graph rule set 108 to evaluate the currently received data block and determine if any of the rules within the graph model rule set 108 are satisfied by receipt of the current data packet. As discussed above, the rule set may represent instances of malware, errors, or unauthorized data values in data sets. In a further aspect, the search system 100 may be used to verify data, rather than identify invalid data. In this aspect, the graph rule set 108 represents a set of rules that describe valid or authorized data patterns.

The search component 106 maintains a current state or graph node as a function of any previously received data blocks. In an aspect, each state in the graph rule set 108 is defined such that it uniquely represents the analysis results of all previously analyzed data as the data relates to the graph rule set 108. Because the current state is the result of previously received data, the search component 106 need not maintain the previously received data for further processing. Instead, once analyzed, data blocks may continue in transit. In an aspect, since it is not necessary to maintain previously processed data blocks, the search component 106 is able to process data blocks in real time, as the blocks pass through the search system 100, and is thus able to keep up with network communication speeds. In an aspect, as each new data block arrives, the state of the graph rule set 108 may be updated based upon the current state and the value of the newly received data block. Once processing of a particular data set is complete, either by identification of a matching rule or a determination that none of the rules in the graph rule set 108 match the data set, the graph rule set 108 may be reinitialized to begin processing the next data set.

In a further aspect, the search system 100 includes an output component 110 that produces output based upon the results of analysis by the search component 106. In an aspect, the output component 110 may generate an alert that is transmitted via the network 102 to users or a network administrator. Alerts may be provided through email, text message, voicemail, a graphical user interface (GUI) (not shown) associated with the search system 100, or any other suitable means. In another aspect, the output component 110 may attach a flag to the data set where such flag will cause the data to be filtered or prevented from reaching the destination.

In an aspect, the search component 106 may comprise a state machine coupled to a lookup table and/or system memory. One or more sequences of program instruction sets residing in the system memory and executable by a processing unit may operate in conjunction with and/or support operations performed on the search system 100. In an exemplary embodiment, the state machine array may be implemented using a Field Programmable Gate Array (FPGA). In another aspect, the search component 106 comprises any hardware and/or software for performing and/or managing search operations.

Figure 2:
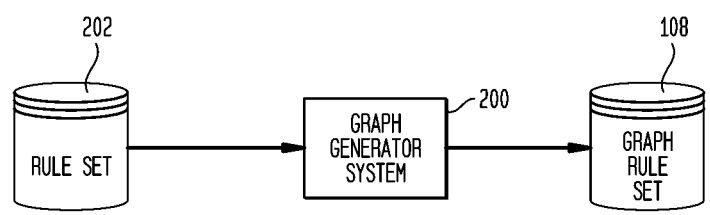
FIG. 2 is a block diagram of a translation system capable of generating a graph model rule set in accordance with an aspect of the subject matter described herein.

Referring now to FIG. 2, an exemplary graph generation system 200 that generates or translates a conventional rule set 202 to a graph model rule 108 set is illustrated. In an aspect, the graph model based search system 100 illustrated in FIG. 1 includes a graph model rule set 108, used to search data sets. The depicted graph generation system 200 creates such graph rule sets 108 by translating conventional rule sets 202. In particular, the graph generator system 200 receives or obtains a conventional rule set 202 that identifies specific strings of data, such as potential malware or verified data. The graph generator system 200 evaluates each rule within the rule set 202, building a graph model rule set 108 based upon the entire rule set.

In an aspect, the data patterns evaluated by the search system 100 depicted in FIG. 1 may be updated by replacing or modifying the graph rule set 108. Accordingly, the graph generator system 200 can produce updated graph rule sets 108, which can be easily distributed for use with search systems 100. For example, if a new malware instance is identified, a rule for such instance is added to the conventional rule set 202. The graph generator system 200 may create a new graph rule set 108 that incorporates this new malware rule, which can be distributed to multiple search systems 100. While processing necessary to create a graph rule set 108 may be significant, the search system 100 does not perform this processing, and therefore update of the graph rule set 108 does not delay network traffic. Instead, this processing may be performed independently by the graph generator system 200. The new graph rule set 108 may be used with any instance of the search system 100, enabling the search system 100 to identify the new malware instance.

Figure 3:
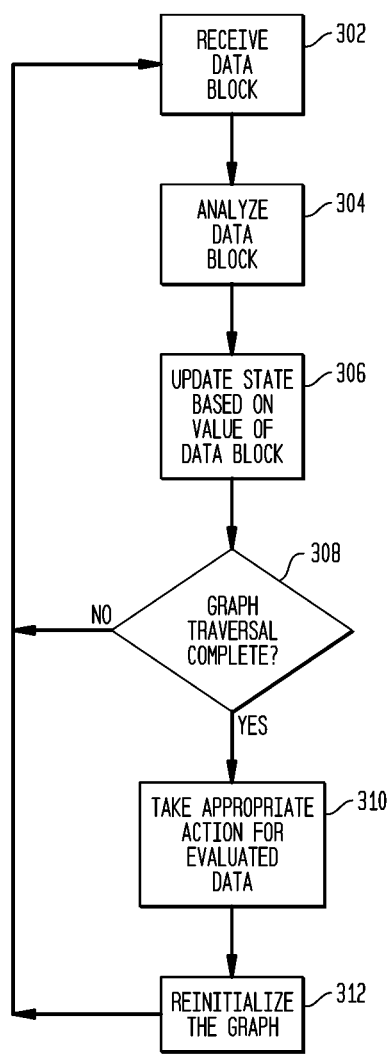
FIG. 3 is a flowchart illustrating a methodology for searching data in accordance with an aspect of the subject matter described herein.
Figure 8:
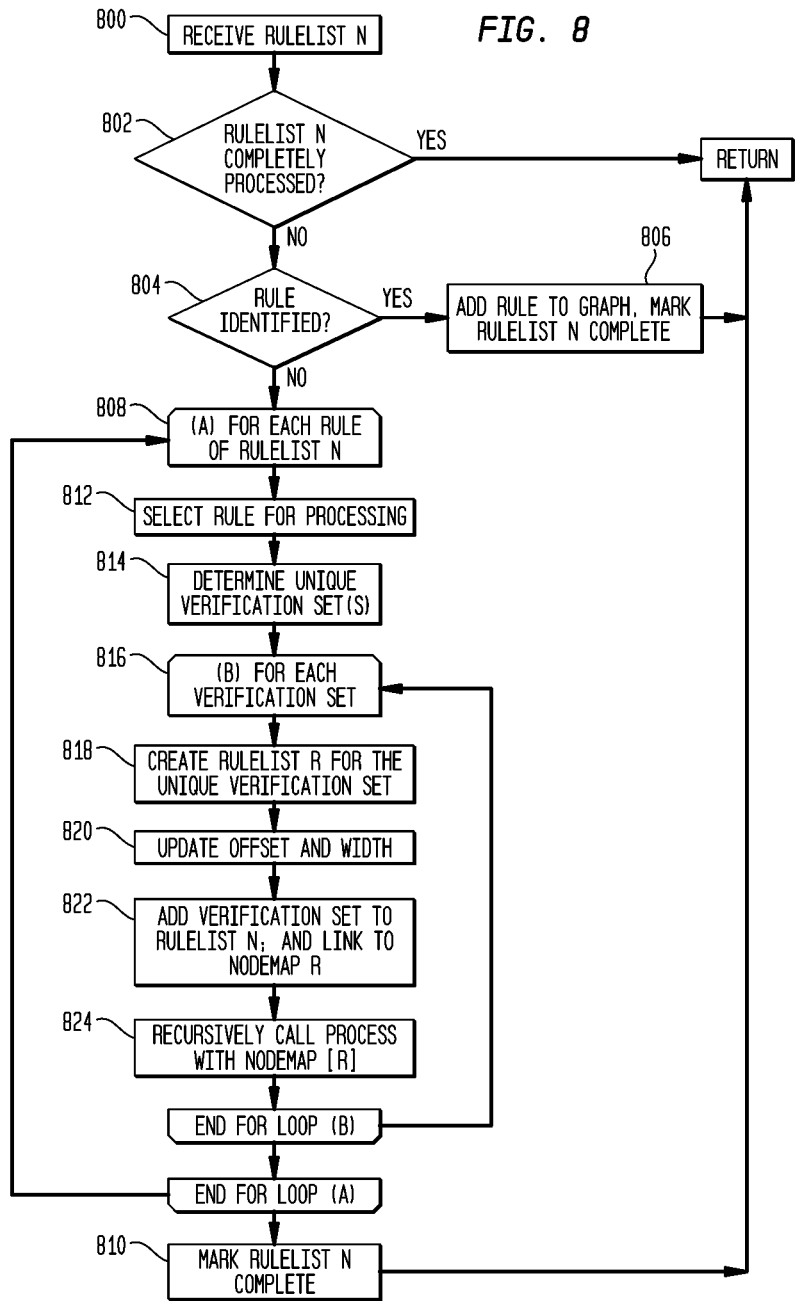
FIG. 8 is a flowchart illustrating a methodology for generating a graph model in accordance with an aspect of the subject matter described herein.

With reference to FIGS. 3 and 8, flowcharts depicting methodologies associated with searching utilizing graph models are illustrated. For simplicity, the flowcharts are depicted as a series of steps or acts. However, the methodologies are not limited by the number or order of steps depicted in the flowchart and described herein. For example, not all steps may be necessary; the steps may be reordered, or performed concurrently.

Turning now to FIG. 3, an exemplary flowchart of a methodology for searching data utilizing a graph model rule set 108 is illustrated. At 302, a block or packet of data is received or obtained for analysis. Using a graph model rule set 108, processing may commence without waiting for an entire data set to arrive and without maintaining previously received data blocks. The received data block is evaluated at step 304. The state of the graph is updated at step 306 based at least in part upon current state of the graph and the received data. In an aspect, the graph state may be updated based solely upon the current state and the received data. For any possible value of the current data block, only one state transition within the graph model will be valid, such that the next state is definite.

Once the new graph state is identified, a determination is made as to whether traversal of the graph is complete at step 308. Completion of traversal of the graph would indicate that either one of the rules of the rule set is identified as matching the received data, or none of the rules in the rule set match the received data. If traversal is not complete, the process returns to step 302, where the next data block is received. The current data block may be released or transmitted without waiting for completion of data evaluation.

If the new state does represent completion of traversal of the graph, such that a determination is made that the data set matches a particular rule, or that the data set matches none of the rules in the rule set, then process will trigger the appropriate response at step 310. For example, in an IDS if malware is identified, appropriate responses may include sending an alert to a network administrator and/or preventing the data from being transmitted through the network. Conversely, if the rule set used in the process identifies data as valid, rather than invalid data, identification of a rule ensures that the data is accepted for further processing.

At 312, the graph may be reinitialized, such that it is ready to process the next data set received. In particular, the current state of the graph may be reset to the initial state. The process then returns to step 302, where the next data packet is received for processing.

The advantages of graph model search methods are more clearly seen through example. In FIGS. 4-7, an exemplary rule set, shown in Table 1 below, is illustrated for use with both tree model and graph model search methods. Each of the rules within the rule set identifies a particular data value or ranges of data values for specific data fields within a given data set. Data sets that include data fields with values that are within the ranges specified by the rule are said to fulfill or match that rule. For example, a rule defined to accept data values between 10,000 and 20,000 for the first data field of a data set would be fulfilled by a data set that included a first data field with a value of 10,001; however, a data set that includes a first data field with a value of 9,999 would not fulfill the rule.

Frequently, rules are specified based upon multiple data fields. For example, where a data set includes multiple data fields, rules can be defined based upon combinations of the data fields. Rules may be defined that specify different data values or ranges of data values for each of the various data fields within a data set. Alternatively, data fields may be expressed using offsets that describe locations within the data set, rather than predefined fields. For example, a rule may be defined that requires the first byte of the data set be less than 300 and the data value at a predefined offset, such as 4 bytes, be between 50 and 100. Each rule may be defined as a set of "verifications", where a verification specifies a data offset and a set of data values.

Turning once again to Table 1, an exemplary set of rules is depicted for analysis.

TABLE 1

Exemplary Rule Set.

| Rule Number | Data Offset | Valid Range |
| --- | --- | --- |
| Rule 1 | A | 50-200 |
|  | B | 21 |
| Rule 2 | A | 50-200 |
|  | B | 5 |
|  | C | 700 |
| Rule 3 | A | 10-100 |
|  | B | 15 |
|  | C | 50 |
| Rule 4 | A | 10-100 |
|  | B | 2-20 |
|  | C | 40 |
|  | D | 22 |
| Rule 5 | C | 100 |
|  | E | 5-50 |

The rule set shown in Table 1 includes five separate rules, identified in the first column as Rules 1 through 5. This example includes only five rules for simplicity; however, rule sets may include any number of rules, including hundreds or hundreds of thousands of rules for evaluation of data. The second column of the table specifies the location or offset within the data set where data comparisons are to be performed for the various rules. In particular, there are five data fields identified by offsets A through E. The third column of Table 1 specifies the value or range of values to be compared to the identified data field. For example, Rule 1 can also be expressed as follows:

$$50 \leq (\text{data field } A) \leq 200 \text{ AND (data field } B) = 21$$

For a data set to match Rule 1, the value of data field A should be greater than or equal to 50 and less than or equal to 200. In addition, the value of data field B should be equal to twenty-one. Both of these conditions must be met for a data set to match Rule 1. Here, Rule 1 includes two verifications, the first defines a range of values for data field A (50 to 200) and the second verification specifies that the value of data field B be equal to twenty-one.

Turning now to FIGS. 4-8, an exemplary data set will be evaluated utilizing the rule set of Table 1. The exemplary data set is defined as follows:

A=70
B=5
C=40
D=22

Figure 4:
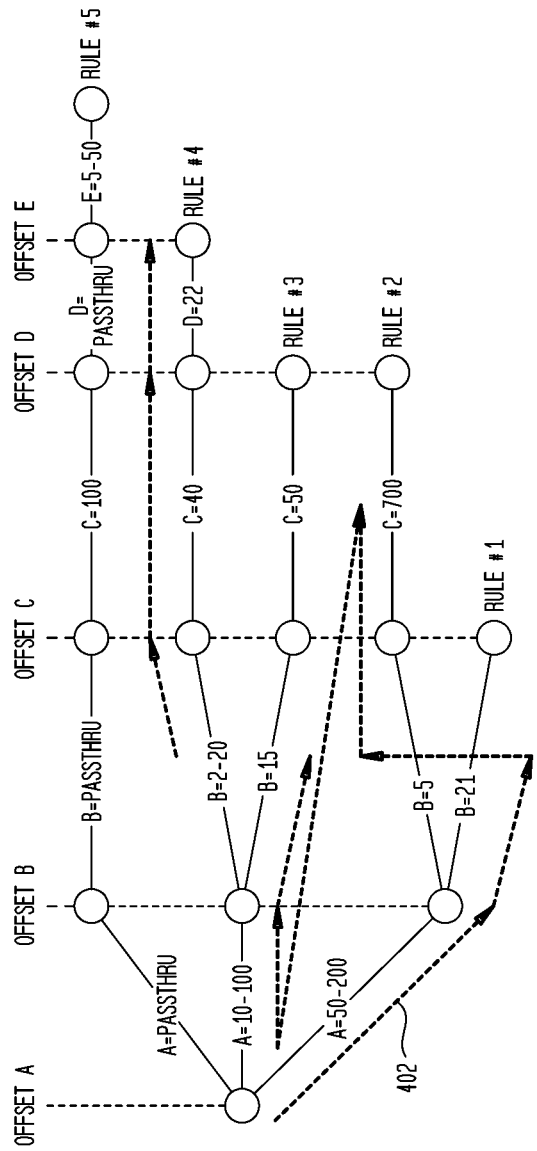
FIG. 4 is an exemplary tree model of the rule set of Table 1.

FIG. 4 illustrates a tree model 400 of the rule set of Table 1. The analysis process of the sample data set is indicated by the dashed line 402. The illustrated tree model data structure 400 depicts each of the five rules from Table 1, where each node in the tree 400 is illustrated as a circle. Offsets in the data set are indicated by the vertical dashed lines, and each branch of the tree 400 represents a valid range for a particular offset for one or more rules. The node at the far right of each branch of the tree 400 indicates that the data set matches a particular rule. During processing, the data set is evaluated against each of the rules sequentially, which can result in multiple evaluations of a single data field.

For example, assuming that Rules 1 through 5 are arbitrarily evaluated in their numeric order, a possible processing flow is indicated by the dotted line 402, where the arrow indicates order of processing. First, Rule 1 is evaluated and the value of data field A is found to match the valid range of 50-200 for Rule 1; however, the value of data field B is not equal to 21, as required for data field B in Rule 1, and the rule is eliminated as a possible match for the data set.

A search system utilizing the depicted tree model of the rule set would next evaluate Rule 2. Using the tree model 400, the tree search system would be able to make use of the fact that Rules 1 and 2 share the same valid data range of 50-200 for data field A and can start evaluating Rule 2 by checking the value of data field B, which matches the value of 5, as required for Rule 2. However, the value of data field C is not equal to 700, as required for Rule 2, and Rule 2 is eliminated as a possible match.

Next, the tree search system evaluates Rule 3. However, Rule 3 does not share the same range of valid values for data field A as Rule 1 and Rule 2; therefore, the tree search system reevaluates data field A to determine whether it meets the valid data range of Rule 3, namely greater than or equal to 10 and less than or equal to 100. Next data field B is evaluated, but fails the requirements of Rule 3, namely that the value of data field B be equal to 15, and Rule 3 is eliminated. Next Rule 4 would be evaluated, and the tree search system is able to make use of the fact that Rules 3 and 4 share the same valid data range of 10-100 for data field A. Consequently, evaluation of Rule 4 begins by checking the value of data field B, which is within the valid data range of 2-20, as required for Rule 4. Next the value of data field C is evaluated and found to be equal to 40, as required for Rule 4. Finally, data field D is evaluated and determined to be equal to 22, such that the data set is found to match Rule 4. Rule 5 need not be evaluated, since a match was found with Rule 4.

It is important to note that some fields within the data set are compared multiple times during the comparison to multiple rules. In particular, the value of data field B is evaluated four separate times and the value of data field A is evaluated twice. This requires that the value of data field A be maintained and available until all of the rules have been processed.

The tree model is relatively efficient for the small sample rule set illustrated in FIG. 4. However, each time a rule is added to the rule set, a new branch must be added to the tree model. Furthermore, since tree search models sequentially process rules, trees that model thousands of rules are likely to be quite inefficient. For example, if a tree includes one thousand rules, and a particular data set matches Rule 1,000, the search method would process nine hundred and ninety-nine rules before determining that the data set matches Rule 1,000. This is particularly inefficient where the data is expected to match rules relatively infrequently. For example, in an IDS system, it is likely that most data sets will match none of the rules that describe malware, yet the data would be sequentially compared to each of the rules before a determination is made that the data does not match any of the malware instances.

Figure 5:
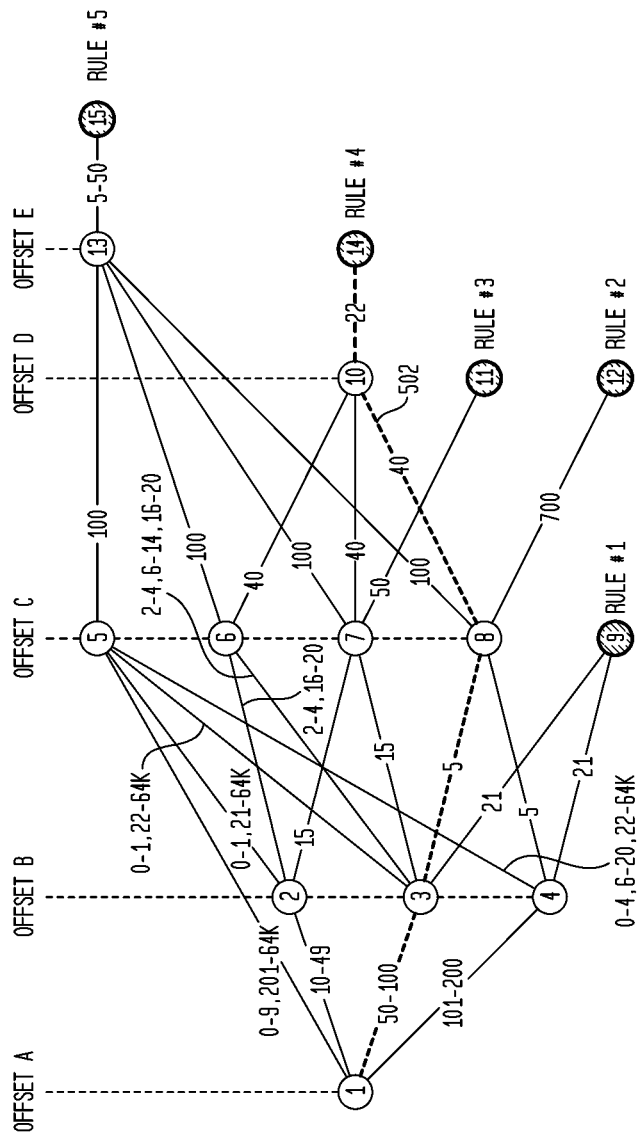
FIG. 5 is an exemplary graph model of the rule set of Table 1 in accordance with an aspect of the subject matter described herein.

Referring now to FIG. 5, an exemplary graph model 500 of the rule set from Table 1 is depicted. Each node or state in the graph 500 is represented by a circle, and numbered for reference. As in the tree illustrated in FIG. 4, the nodes are coordinated with various offsets in the data set, where the offsets are represented by dashed, vertical lines. The links between the states represent analysis or evaluation of the data at the offsets and transitions to new states. It is important to note that these links differ from the links of the tree model illustrated in FIG. 4; however, the state transitions are derived from the same five rules of Table 1.

Looking at the evaluation of the exemplary data set using the model graph 500 of FIG. 5, processing begins at state 1 on the far left of the graph 500, the initial state. Processing of the data set is illustrated in a dashed line 502. First, the graph search system 100 checks the value of data field A and finds the value 70, which matches the range of 50-100. Note, that only one transition from state 1 is valid for any particular value of data field A. Following the valid link for a data value of 70, the graph search system 100 transitions to State 3 in the graph 500. Next, the value of data field B is determined. Once again, only one link from State 3 will be valid for any value of data field B. In this example, data field B is equal to 5 and causes a transition from state 3 to state 8 of the graph 500. At state 8, the value of data field C is evaluated. In the exemplary data set, data field is equal to 40, which leads to state 10 in the graph 500. Finally, the value of data field E is determined to be 22, which causes the transition to state 14, where it is determined that Rule 4 has been satisfied by the data set.

In looking at the tree search system and the graph search system 100 examples, FIGS. 4 and 5 respectively, it can be seen that the graph model 500 has a single path 502 of state transitions for the exemplary data set. In contrast, the tree model path 402 doubles back several times in the data processing flow. In the illustrated example, the data processing path through the graph model 502 represents the "shortest distance" or at least fewer evaluations between the initiation of the search and identification of a rule. This can translate to higher processing speeds and deterministic processing times.

As discussed above, the transitions between states in the graph model 500 do not necessarily represent particular values and ranges explicitly specified in the rules. For example, state 3 of the graph model 500 is reached when the value of data offset A is greater than or equal to 50 and less than or equal to 100, a range not specified in any rule of Table 1. Instead, the transitions in the graph model 500 are derived from the sample rule set, and are selected such that each state uniquely represents previously analyzed data fields. This eliminates the necessity of doubling back through the graph 500 to reevaluate data fields already processed.

Figure 6:
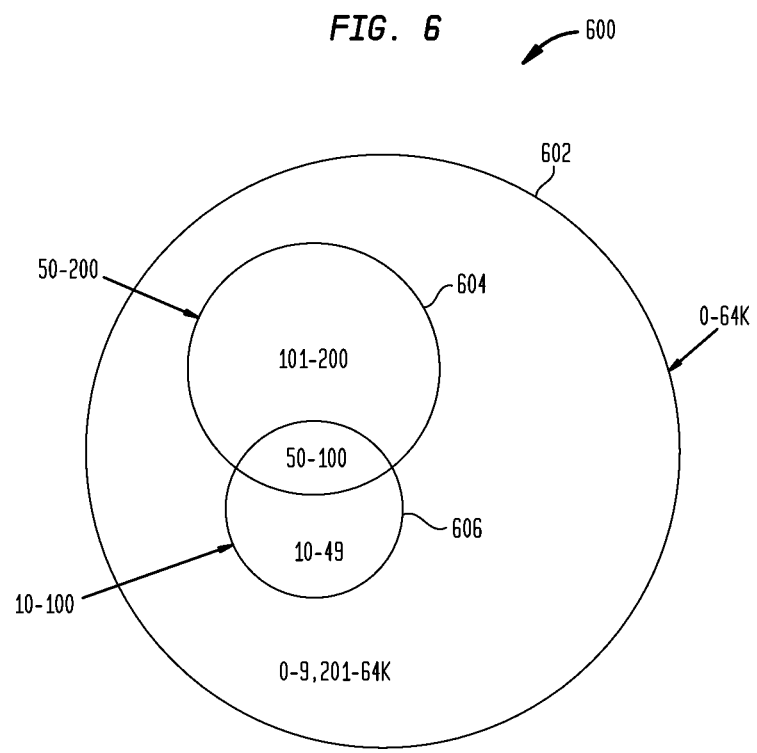
FIG. 6 is a Venn diagram representation of the rule set of Table 1, for values of data field A.

Looking now at FIG. 6, a Venn diagram 600 of the rule set of Table 1 for data field A is illustrated. In fact, the state transition paths from state 1 to states 2, 3 and 4 are effectively defined by the sets represented in the Venn diagram 600. The largest circle 602 represents the entire range of possible values for data field A. For example, if data field A is a 16 bit data field, the possible data values are zero to sixty-four thousand, as indicated in FIG. 6. The second largest circle 604 represents the range of data values of fifty to two hundred (50 to 200), which is present in both Rules 1 and 2. The smallest circle 606 represents the range ten to one hundred (10 to 100), which is present in both Rules 3 and 4. The Venn diagram 600 illustrates the shared area between the second largest circle 604 and the smallest circle 606 is the range of data values from fifty to one hundred (50 to 100). Data values within that shared range are valid for Rules 1, 2, 3, 4 as well as Rule 5, which has no required range for data field A. The transition paths from state 1 for data field A values in the graph are defined by the unbroken areas of the Venn diagram 600. In particular, the valid state transitions are: 10-49, 50-100, 101-200, and (0-9 and 201-64K).

It is important to note that the states of the graph 500 do not necessarily correspond to one specific rule. For example, state 3 can ultimately result in satisfying any of the five rules, effectively leaving all options open until further data fields become available for evaluation. The graph interpretation 500 of the exemplary rule set appears to be more complex than the tree representation 400 and, in fact, it is. Building a graph 500 for a large number of rules may require a great deal of computing power. However, the process of creating the graph 500 from the rule set need only be performed during configuration of the search system 100. This extra processing need not impact the real time processing performance of the graph model search system 100. In effect, much of the complex computations may be completed before the search system 100 is used to search data. Translation of a conventional rule set to a graph model rule set 108 is discussed in detail below.

FIG. 7 shows an embodiment of a search system capable of processing the example rule set, utilizing a graph model based representation of the rule set. The search system may comprise a table 700 stored in memory as shown in the center columns, columns 2 through 7. The first column of the illustrated table 700 denotes a memory address for each entry in the table and is not part of the table data stored in memory. The column entitled "offset" identifies a data field of the incoming data for analysis. The data field references (e.g., A, B, . . . , E) from the example illustrated in Table 1, and FIGS. 4-6 are shown for simplicity, alternatively, the offset entry can be a byte offset from the beginning of the data set. The column entitled "# bytes" describes the size of the data field that begins at the "offset." In an aspect, data fields may be of varying sizes. The columns entitled "min val" and "max val" define a range of valid values for the data field. A singular value is defined by setting "min val"="max val." A row of the table 700 effectively represents a link or transition from a current state to a new state within the graph rule set 108. If the data value of the current offset falls within the range of valid values (e.g. between min val and max val), then the row indicates the transition to the next state. In an aspect, the column entitled "pointer" may provide a memory pointer, or location in the Table 700, to jump to if the data comparison is successful. This pointer provides the link to follow if the data field is within the valid ranges. The column labeled "Rule #" denotes the particular rule that is identified once a rule is successfully satisfied by a data set. The column labeled "notes" identifies the link or state transition that is represented in the row. This column is not necessary for the table 700 in a search system 100; it is added simply to improve readability of the table 700 depicted in FIG. 7.

The table 700 can be better understood through looking at processing of an example data set. The dashed line 702 adjacent to the table 700 shows the steps that the search system 100 performs in processing the exemplar data set of Table 1. Processing begins at memory location Addr 0 in the table 700, where data field A is compared to the min val and max val range of greater than or equal to 10 and less than or equal to forty-nine (10-49). The comparison fails since the value of data field A is equal to seventy (70). Because the data field value does not match, the link or state transition represented in row 1 of the table 700 is not used and pointer is not followed. Instead, the search system 100 continues to the next step in the table 700 at memory location address 1.

At memory address 1, the data field value (70) is compared with a range of greater than or equal to fifty and less than or equal to 100 (50-100). This comparison is valid, and therefore the link or state transition represented in this row is followed. Therefore, the pointer is followed, resulting in a jump to the memory address equal to the pointer, in this case memory address 7. At this point, data value of data field A is successfully processed and is no longer required for processing.

At memory address 7, the value of data field B (5) is compared unsuccessfully to the valid data range, which in this case consists solely of the data value 21. Because the comparison is unsuccessful, the data set is not identified as a match for Rule 1. Instead, the search system 100 continues processing and moves to the next memory location in the table 700, memory address 8. Here, a successful comparison is made to the valid data range, which consists of the value 5, as denoted by the min val and max val of 5. Because the comparison is successful, the state transition represented by this row (memory address 8) is followed. Accordingly, the pointer at memory address 8 is used, which results in a jump to memory address 21.

At memory address 21, data field C, with a value of 40, is compared to a min val and max val equal to 40. This results in a match, and the state transition for this row is followed. Accordingly, the pointer value of 24 is followed to jump to memory address 24. A final comparison is made at memory address 24, where data field D is compared to a min val and max val of 22. This comparison is successful and the matching rule is identified as Rule 4. It should be noted for one of ordinary skill in the art, there are multiple ways of constructing a search engine and that this representation is meant to demonstrate the concept and not limit the scope of the search system described herein.

Turning now to FIG. 8, an exemplary methodology for creating a graph model 108 from a conventional rule set 202 is illustrated. The flowchart depicts a recursive algorithm for graph creation. That same algorithm is also illustrated in the following pseudocode:

```
ExpandNode(ruleList N)
    if N is complete
        return
    if N contains one rule and it is empty
        add NULL verification with link to rule
        mark N complete
        return
    for each rule in the rule list
        determine lowest offset O
        determine smallest width at offset O assign it W
        determine unique verification sets
            -- including * set for those without O with width W
        for each unique verification set
            create ruleList R with rules for this set
                --ensure that rules with offset O and width not W
                --are properly excluded from the list based on the
                --verification criteria
```

```
            pop offset O with width W from R
            add Verification List to N and link to NodeMap[R]
            add
                ExpandNode(nodeMap[R])
        mark N complete
        return
notes:
Start with all rules in a single ruleList N
nodeMap is the lookup for a given ruleList to see if it exists
```

Turning once again to FIG. 8, at step 800, RuleList N is received for processing. If this is the first time that the method is called or invoked, then the RuleList N includes all rules that are to be translated into the graph model 108. Each rule may include a set of verifications composed of individual offsets or data fields that define the rule as well as valid data ranges for each offset or data field. The illustrated graph creation methodology may be recursive in nature, which means that the method recursively invokes an instance of the method itself during processing. Upon completion, the invoked method returns with a portion of the graph, a subgraph, that becomes part of the complete graph created by the invoking or parent method. There can be numerous levels of recursion each producing portions of graphs and subgraphs. Accordingly, when the method is initially invoked, RuleList N includes all rules in the conventional rule set 202; however, when method is invoked recursively, RuleList N includes a subset of the rules which will be transformed into a subgraph of the overall graph model 108. In particular, RuleList N includes all rules that remain available at the time the recursive method is invoked. RuleList N includes only rules viable for the subgraph to be processed by the invoked method, excluding rules that cannot be matched due to previously processed data offsets. In an aspect, in each rule data offsets already processed by parent methods are marked as processed or removed, such that only those offsets applicable for the subgraph to be generated are available.

At step 802, a determination is made as to whether the RuleList N has been completely processed, such that there are no rules remaining in the RuleList N. If yes, the method ends and if the method was recursively invoked, the processing will continue in the parent method which invoked it. If the RuleList N has not yet been completely processed, at step 804, a determination is made as to whether a rule is currently identified. When a rule is identified or defined, a single rule remains in the RuleList N and no further offsets for the rule remain to be processed. Any data reaching this state or node in the created graph will fulfill the single rule remaining in the RuleList N. Accordingly, if the rule is identified, at step 806 the rule is added to the graph. Adding the rule consists of adding a null node to the graph and a link to the identified rule. RuleList N is marked as complete and the process returns to the parent method, if any, that invoked the current instance of the method.

If a rule is not identified at step 804, then each remaining rule in RuleList N is processed. At step 808, For loop (A) begins processing each rule within RuleList N. Upon completion of For Loop (A), the RuleList N is marked complete at step 810 and the method returns to the parent method. Within For Loop (A), at step 812, the next rule in the RuleList N is selected for processing. In an aspect, the rule with the lowest or smallest offset from the current data set location is selected for processing. In an aspect, if there are multiple rules with the same offset, then the rule with the smallest width data value is selected from the set of rules for that offset.

At step 814, one or more unique verification sets are determined for the rule currently being processed. As used herein, the term "unique verification set" means a group of verification that include all of the valid data values, where each verification is unique and there is no overlap between the verifications. In an aspect, step 814 effectively splits nodes of the tree model to generate multiple graph nodes, each of which represents a unique state. As seen in the exemplary rules and illustrated in FIG. 4, it is permissible for rules to include overlapping verifications. For example, Rule 1 shown in Table 1, includes a verification for data field A where data values between 50 and 200 are valid. Rule 3 shown in Table 1, includes a verification for data field A in which values between 10 and 100 are valid. Therefore, for data field A, values between 50 and 100 would be acceptable for either Rule 1 or Rule 3. Looking at the tree illustrated in FIG. 4, data values between 50 and 100 are accepted for two separate links from the initial node. However, in a graph model 108, such overlapping verifications, represented as links or state transitions, are unacceptable. Instead, a unique verification set is generated, such that for any given data value, only one verification or state transition is valid. Looking again at Rules 1 and 3, separate verifications may be defined as follows: set A [10-49]; set B [50-100]; set C [101-200]; set D [0-9, 201-maximum value]; and set E, which would provide for any rules that did not include an Offset A.

In an aspect, each unique verification may become a transition state or link in the graph and is processed and added to the graph in turn. At step 816, For Loop (B) processes each unique verification. When processing of all of the verifications within the unique verification set is complete, the method returns to step 808, where the next rule in RuleList N is processed. During processing of a verification, at step 818 a new RuleList R is created for the particular verification. The RuleList R is effectively a subgraph of the Rule List N. In particular, RuleList R will include any rules that remain possibilities based upon the data values accepted by the verification, for the particular offset. For example, looking at the graph of FIG. 5, at node 2, the RuleList R would still include Rules 5, 4 and 3. Once the state of node 2 is reach, Rules 1 and 2 have been eliminated.

At step 820, the offset value or data field and the width of the current data field are updated, based upon the progression through the rule sets. As discussed above, a rule consists of a list of offsets and comparison to data values. During creation of the graph rule set 108, each offset is processed in order. At step 822, the verification is added to RuleList N, the graph model. In addition, a link is added to RuleList N, to the new subgraph, the nodeMap [R], for the verification. Finally at step 824, the method is called recursively, to generate the subgraph, nodeMap[R], input for processing and expansion. In this manner, the graph rule set 108 is generated from the original set of rules 202.

FIG. 8 illustrates an exemplary method to calculate a graph rule set 108 from a tree representation rule set 202. After applying this methodology to the tree data provided in FIG. 4, the result is the graph representation depicted in FIG. 5. This methodology can be used to process far larger rule sets than the trivial example provided herein.

Figure 9:
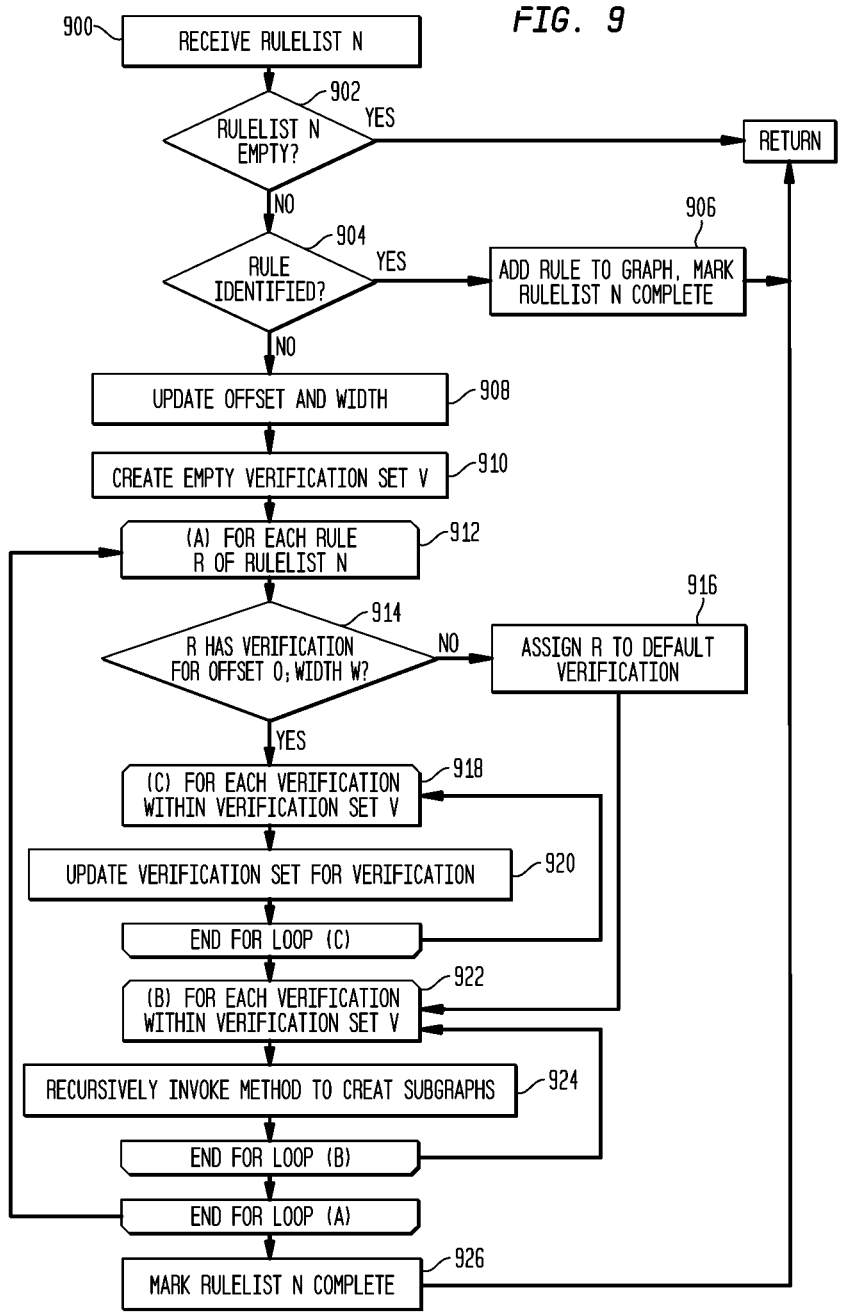
FIG. 9 is a flowchart illustrating another embodiment methodology for generating a graph model in accordance with an aspect of the subject matter described herein.

Turning now to FIG. 9, another exemplary methodology for creating a graph model 108 from a conventional rule set 202 is illustrated. The flowchart depicts a recursive algorithm for graph creation. That same algorithm is also illustrated in the following pseudocode:

```
ExpandNode(ruleList N)
    if N is complete
        return
    if N contains one rule and it is empty
        add NULL verification with link to rule
        mark N complete
        return
    determine lowest offset O
    determine smallest width at offset O assign it W
    create empty verificationSet V for ruleList N
    for each rule R in N
        if R has a verification [L,H] at offset O and width W
            for each comparison [L',H'] in V
                if (L < L') and (H < H')
                    add R to V.[L,H].RuleList
                elseif (L <= L') and (H >= L') and (H < H')
                    add R to V.[L,L'].RuleList
                    copy V.[L',H'].RuleList and place in
                        V.[L',H].RuleList
                    add R to V.[L',H].RuleList
                    revalue V.[L',H'] to V.[H,H']
                elseif (L <= L') and (H >= L') and (H > H')
                    add R to V.[L,L'].RuleList
                    add R to V.[L',H'].RuleList
                    add R to V.[H',H].RuleList
                elseif (L > L') and (H <= H')
                    copy V.[L',H'].RuleList and place in
                        V.[L,H].RuleList
                    copy V.[L',H'].RuleList and place in
                        V.[H,H'].RuleList
                    revalue V.[L',H'] to V.[L',L]
                    add R to V.[L,H].RuleList
                elseif (L <= H)
                    copy V.[L',H'] RuleList and place in
                        V.[L,H'].RuleList
                    add R to V.[L,H'].RuleList
                    add R to V.[H',H'].RuleList
                    revalue V.[L',H'] to V.[L',L)
                else
                    add R to V.[L,H].RuleList
                pop verification at offset O and width W from Rule R
        else
            add R to V.[*,*].RuleList
    for each unique verification in V
        ExpandNode(nodeMap[R])
    mark N complete
    return
notes:
Start with all rules in a single ruleList N
[L,H] represents a verification at offset W with L being the lower
    and H being the Higher value. A single comparison can be
    accomplished by [n,n]. each verification has a single ruleList
    associated with it at an offset and/or width > O,W
[ ] inclusion/exclusion will depend on < vs <= and > vs >=
    ignored for simplicity
nodeMap is the lookup for a given ruleList to see if it exists
```

Turning once again to FIG. 9, at step 900, RuleList N is received for processing. If this is the first time that the method is called or invoked, then the RuleList N includes all rules that are to be transformed into the graph model 108, for each subsequent invocation of the method, the RuleList N is comprised of rules that are to be translated into a subgraph of the graph model 108. Each rule is composed of one or more verifications that specify an individual offset or data field and a valid data range associated with each offset or data field. The illustrated graph creation methodology is recursive in nature, similar to the methodology illustrated in FIG. 8. Upon completion, the invoked method returns a portion of the graph, a subgraph, that is added to the overall graph created by the invoking or parent method. There can be numerous levels of recursion, each producing subgraphs that combine to form the complete graph. Accordingly, when the illustrated method is initially invoked, RuleList N includes all rules of the conventional rule set 202; however, when method is invoked recursively, RuleList N includes a subset of the rules. In particular, RuleList N includes all rules that are viable for the subgraph to be processed by the invoked method, and excludes rules associated with other portions of the graph.

At step 902, a determination is made as to whether the RuleList N has been completely processed, such that no rules remain in RuleList N. If yes, the method ends and if the method was recursively invoked, the processing will continue in the parent method which invoked it. If the RuleList N has not yet been completely processed, at step 904, a determination is made as to whether a rule is currently identified. When a rule is identified or defined, a single rule remains in the RuleList N and no further verifications for the rule remain to be processed. Any data reaching this state or node in the created graph will fulfill the single rule remaining in the RuleList N. Accordingly, if the rule is identified, at step 906 the rule is added to the graph. Adding the rule consists of adding a null node to the graph with a link to the identified rule. The RuleList N is then marked as complete and the process returns to the parent method, if any, that invoked the current instance of the method.

If a rule is not identified at step 904, then the remaining rules in the RuleList N is processed for addition to the graph. First, the offset within the data record and width of the data to be evaluated are updated at 908. As discussed above, each rule consists of one or more verifications, which define an offset into a data record, a set of data values, and the width of the data field for comparison. In an aspect, the lowest unprocessed offset 'o' that appears in any of the rules in the RuleList N is selected. Similarly, the smallest width 'w' for the selected offset 'o' is selected. As the method recursively generates a graph from RuleList N, each of the offsets and data field widths which make up the rules of RuleList N are processed.

At 910, an empty unique verification set 'V', denoted in the accompanying pseudocode as VerificationSet V, is created for RuleList N. As discussed above, a unique verification set is a group of verifications that include all valid data values, where each verification is unique and there is no overlap between the verifications. Upon completion of the method, the VerificationSet V will include multiple verifications that [cover] all possible data values for the offset o and width w. Each verification of the VerificationSet will have some number of associated RuleLists. When complete, VerificationSet V defines the graph links, as depicted in FIG. 5.

At step 912, For loop (A) processes each rule R within RuleList N. Upon completion of For Loop (A), the RuleList N is marked complete at step 810 and the method returns to the parent method. Within For Loop (A), each of the verifications associated with the Rule R are processed. At 914, a determination is made as to whether the current rule R being processed has a verification for the particular offset 'o' and width 'w'. For example, turning again to the sample rule set depicted in Table 1, at offset A, Rule 1 has a valid data range of fifty to 100 (50-100). However, Rule 5 does not have a predefined set of valid values for Offset A. Accordingly, any values within Offset A satisfy the requirements of Rule 5. Therefore, Rule 5 has no verification associated with Offset A. At 914, if it is determined that the current rule R has no verification for offset 'o', width 'w', then at step 916 then the rule R is associated with the default verification of the verification set. The default verification accepts all values, and can be represented as V.[*,*].

If at 914, it is determined that rule R has a verification for offset 'o' and width 'w', then the rule R verification is processed with each verification within the verification set in For Loop (C) at step 918. At step 920, the verifications of verification set V are updated based upon the verification of rule R.

In an aspect, rule R verification is compared to the verifications of verification set R. Based upon the comparisons, the verifications are updated and new verifications are added to ensure that each verification with the VerificationSet V is unique, and that there is no overlap among the verifications within the VerificationSet V. If any overlap of verifications is detected, new verifications are added to the Verification Set, and pre-existing verifications are modified as needed at step 920. These comparisons and updates are shown in detail in if, elseif lines of the pseudocode above.

Once the set of unique verifications is created, the process continues at step 922, where each verification is processed in turn. In an aspect, each unique verification represents a transition state or link in the graph. At For Loop (B) each verification of verification set V is processed and added to the graph in turn. At step 924, a subgraph is created by recursively invoking the method for each verification and its associated rules. When processing of all of the unique verifications is complete, the method returns to step 912, where the next rule is processed. Finally, at 926, the ruleList N is marked as completely processed, and the method returns to the parent method that invoked it.

While various embodiments have been described above, it should be understood that the embodiments have been presented by way of example only, and not limitation. It will be understood by those skilled in the art that various changes in form and details may be made therein without departing from the spirit and scope of the subject matter described herein and defined in the appended claims. Thus, the breadth and scope of the present invention should not be limited by any of the above-described exemplary embodiments, but should be defined only in accordance with the following claims and their equivalents.

What is claimed is:

1. A computer-based method for searching a data set for one or more data values, comprising:
    obtaining a data block of the data set;
    traversing a graph rule set based at least in part upon a current state of said graph rule set and said data block, wherein a value of said data block falls within a predefined range of values of said graph rule set, and wherein said graph rule set is a graph representation of a set of rules;
    identifying a rule of said set of rules as a function of traversal of said graph rule set for the data set, wherein said set of rules describes the one or more data values;
    wherein traversing a link of said graph rule set comprises comparing said data block with a value range not specified in said identified rule; and
    modifying said data set by attaching a flag to said data set.

2. The method of claim 1, wherein said current state of said graph rule set is a function of a previously processed data block of the data set.

3. The method of claim 1, wherein the graph rule set is implemented as a field programmable gate array.

4. The method of claim 1, further comprising filtering the data set to generate a filtered data set based at least in part upon identification of said rule.

5. The method of claim 1, wherein the step of traversing said graph rule set comprises:
    evaluating a set of available state transitions of said graph rule set, wherein said available state transitions link said current state to a set of available states;
    selecting a state transition from said set of available state transitions as a function of a value of said data block; and updating said current state of said graph rule to one of said available states as a function of said selected state transition.

6. The method of claim 5, wherein only said selected state transition is selectable from said set of available state transitions based upon said value of said data block.

7. The method of claim 1, wherein said graph rule set is implemented as a table maintained in a memory.

8. The method of claim 1, wherein the data set is a stream of data and further comprising transmitting said data block upon traversal of said graph rule set as a function of said data block.

9. The method of claim 1, further comprising:
modifying said set of rules to adapt said one or more data values; and
updating said graph rule set as a function of said modified set of rules.

10. The method of claim 1, wherein said one or more data values are indicative of undesired data.

11. The method of claim 1, wherein said one or more data values are authorized data values.

12. The method of claim 1, further comprising transmitting an alert to a user.

13. The method of claim 1, wherein a first rule and a second rule of said set of rules specify a range of overlapping valid values for said data block.

14. A system for searching a data set for one or more data patterns, comprising:
a receiver computer configured to obtain at least one data block of the data set;
a rule computer configured to generate a graph rule set that represents a set of rules as a graph, wherein said set of rules describes the one or more data patterns;
a search computer configured to traverse said graph rule set as a function of a current state of said graph rule set and said at least one data block, wherein a value of said data block falls within a predefined range of values of said graph rule set, and identifies a rule of said set of rules based upon traversal of said graph rule set; and
a mechanism configured to read said identified rule and modify said data set by attaching a flag to said data set based on at least in part on said identified rule.

15. The system of claim 14, wherein said current state of said graph rule set is a function of a previously processed data block of the data set.

16. The system of claim 14, wherein said graph rule set is implemented as a table maintained in a memory.

17. The system of claim 14, further comprising said rule computer generating an updated graph rule set based at least in part on a modified set of rules that reflect a change in said one or more data patterns, wherein said graph rule set is replaced by said updated graph rule set.

18. the system of claim 14, wherein the one or more data patterns are indicative of malware.

19. The system of claim 14, further comprising an output component that generates output as function of an identification of said rule.

20. The system of claim 14, further comprising a mechanism configured to transmit an alert to a user.

21. A system for filtering a data set for one or more data patterns; comprising:
means for obtaining a data block of the data set;
means for searching the data set using a graph rule set and based at least in part upon a current state of said graph rule set and said data block, wherein a value of said data block falls within a predefined range of values of said graph rule set, and wherein said graph rule set is a graph representation of a set of rules that describe the one or more data patterns;
means for filtering the data set to generate a filtered data set based at least in part upon searching the data set; and
means for modifying said data set by attaching a flag to said data set based at least in part upon said set of rules and said data set.

22. The system of claim 21, further comprising a means for transmitting an alert to a user.

* * * * *